(12) United States Patent
Macintyre et al.

(10) Patent No.: US 7,640,404 B2
(45) Date of Patent: Dec. 29, 2009

(54) FILE SYSTEM WRITE FILTERING FOR SELECTIVELY PERMITTING OR PREVENTING DATA FROM BEING WRITTEN TO WRITE-PROTECTED STORAGE

(75) Inventors: John F. Macintyre, Seattle, WA (US); Saad Syed, Kirkland, WA (US); Zhong Deng, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/263,469

(22) Filed: Oct. 31, 2005

(65) Prior Publication Data
US 2007/0101079 A1    May 3, 2007

(51) Int. Cl.
*G06F 13/16* (2006.01)
*G06F 17/30* (2006.01)

(52) U.S. Cl. .................. 711/154; 711/113; 711/118; 711/163; 711/165; 707/1; 707/2; 707/204; 707/205

(58) Field of Classification Search .............. 711/113, 711/118, 154, 163, 165; 707/1, 2, 204, 205
See application file for complete search history.

(56) References Cited

U.S. PATENT DOCUMENTS

| 6,463,509 | B1 * | 10/2002 | Teoman et al. | 711/137 |
|---|---|---|---|---|
| 6,850,955 | B2 * | 2/2005 | Sonoda et al. | 707/200 |
| 7,334,095 | B1 * | 2/2008 | Fair et al. | 711/161 |
| 2002/0174102 | A1 * | 11/2002 | Kyler | 707/1 |
| 2003/0182500 | A1 * | 9/2003 | Raves et al. | 711/113 |
| 2003/0221083 | A1 * | 11/2003 | Hill et al. | 711/207 |
| 2003/0231207 | A1 | 12/2003 | Huang | |
| 2005/0027957 | A1 * | 2/2005 | Page et al. | 711/163 |
| 2005/0065985 | A1 * | 3/2005 | Tummala et al. | 707/201 |
| 2005/0198447 | A1 * | 9/2005 | Corrado | 711/152 |
| 2006/0271541 | A1 * | 11/2006 | Snyder | 707/7 |

* cited by examiner

*Primary Examiner*—Tuan V Thai
*Assistant Examiner*—Shawn Eland
(74) *Attorney, Agent, or Firm*—Senniger Powers LLP

(57) ABSTRACT

File system write filters are provided which can selectively permit or prevent data from being written-protected storage media. The write filter utilized volatile cache memory to store data that is requested to be written to storage media by applications programming interface function calls. In one aspect, if the particular data is requested to be written to a file that is a file identified on the file exclusion list, the data can be written to the file in non-volatile storage. Otherwise, the particular data is written to volatile cache memory. In another aspect, the write filters can be utilized on computing devices to create a stateless computing device wherein data is written to volatile cache memory in response to write function calls. Upon rebooting, any data that was saved to the volatile cache memory is discarded and the computing device is restored to its original state.

19 Claims, 2 Drawing Sheets

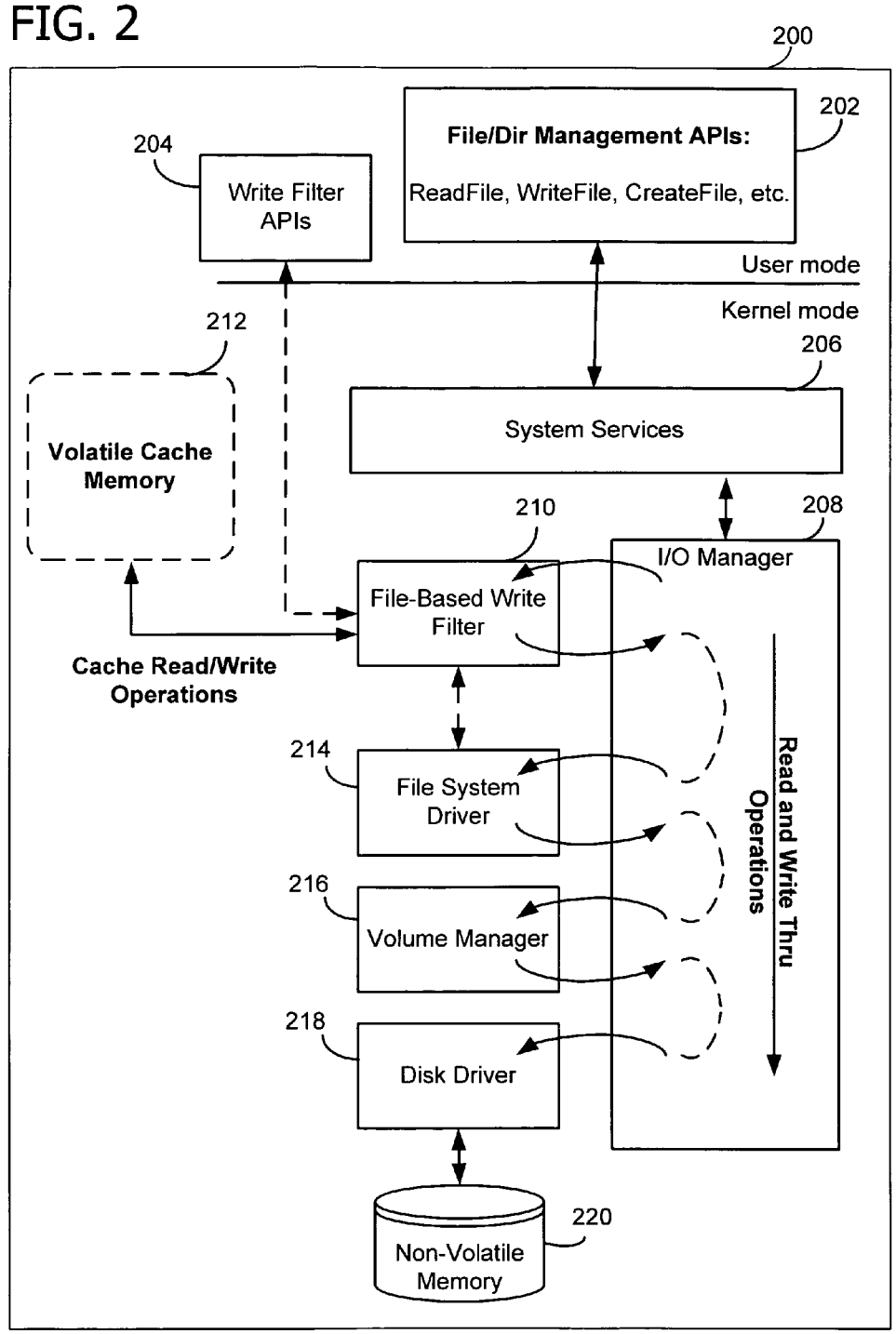

FILE SYSTEM WRITE FILTERING FOR SELECTIVELY PERMITTING OR PREVENTING DATA FROM BEING WRITTEN TO WRITE-PROTECTED STORAGE

BACKGROUND

Computing devices are becoming more accessible and common in public use locations such as libraries, internet cafes, print/copy stores, and the like. These computing devices can be used by multiple people each day who conduct a variety of tasks, such as conducting internet searches, sending and receiving emails, creating and publishing documents, and so forth. With a wide variety of tasks to perform, the computing devices execute a number of differing applications. Many of the applications and also the computing devices' operating systems, during their execution, attempt to write data to non-volatile storage devices, such as a hard drive of the computing device. Additionally, computer users may also attempt to download files from remote locations such as files obtained over the internet or other computer network to non-volatile storage devices of the computer.

Writing data to non-volatile storage devices can cause problems with the operation of the computer device such as overwriting critical files for the operation of the computing device, infecting the computing device with a computer virus, corrupting data, and the like. Additionally, private files, email messages, etc. may be inadvertently written to a hard drive of a public use computing device thereby compromising the privacy of personal files of the users of the computing device.

Methods of the known art for preventing data from being written to non-volatile storage devices have been utilized which can provide write protection of a storage media by preventing data from being saved at the sector/block level of the storage device. However, while these methods provide a level of write-protection at lower levels of the storage media, they do not permit write-protection to be implemented at a more precise level.

SUMMARY

One or more deficiencies of the known art are overcome by improved methods of write-protecting non-volatile storage media by utilizing volatile cache memory to store data at the file system level that is prohibited from being saved to write-protected volumes.

In one aspect, a method for write-filtering data is provided that prevents data from being written to non-volatile storage media at the file system level. Function calls issued by an application programming interface are analyzed to determine whether to read certain data from a file or to write particular data to a file. If the function call is to write particular data to a file, the data is written to volatile cache memory. Alternatively, if a function call is to read certain data from a file, the volatile cache memory is checked to determine if the certain data is stored there. If it is, the certain data is read and returned to the application programming interface.

In another aspect, a write filter includes an exclusion list that identifies specific files residing on non-volatile storage devices to which particular data may be written. Thus, if a function call is received that requests particular data to be written to a file, the exclusion list is checked to determine if the specific file is a file identified on the file exclusion list. If the file is on the exclusion list, the particular data can be written to the specific file on a non-volatile storage media. However, if the file is not present on the exclusion list, the particular data is instead written to volatile cache memory.

Beneficially, aspects of the write filter allow volume protection at the file level, thereby permitting protection at a more precise level that that of the known art.

Alternatively, aspects of the invention may comprise various other methods and apparatuses.

Other features will be in part apparent and in part pointed out hereinafter.

BRIEF DESCRIPTION OF THE DRAWINGS

FIG. 2 is a block diagram illustrating one exemplary embodiment of a suitable system of the present invention.

Corresponding reference characters indicate corresponding parts throughout the drawings.

DETAILED DESCRIPTION

Figure 1:
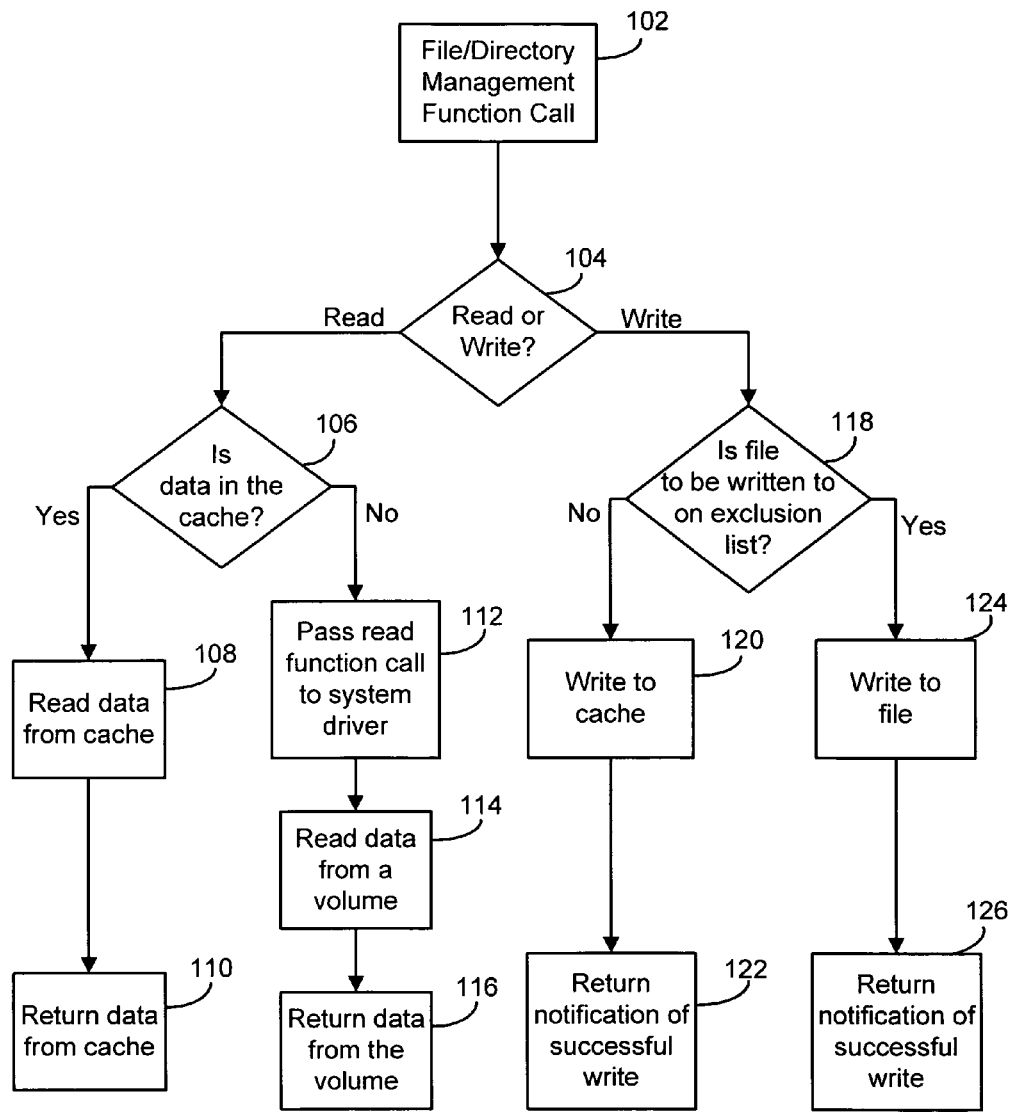
FIG. 1 is an exemplary flowchart of one embodiment of a method of write filtering.

FIG. 1 is an exemplary flowchart of one embodiment of a method of write filtering. The method is initiated when a file or directory management function call is received from an application programming interface at 102. At 104, a determination is made whether the function call is to read certain data from a file or to write particular data to a file. If it is determined that the function call is to read certain data from a file, at 106, a determination is made whether the certain data is located in cache memory. If the certain data is in cache memory, the certain data is read from the cache memory at 108, and the certain data is returned to the application programming interface at 110.

If a determination is made at 106 that the certain data is not present in the cache memory, the read function call is passed to the system driver at 112. The system driver locates the certain data on a volume at 114, and returns the certain data to the application programming interface at 116. In one embodiment, the certain data returned by the system driver is written to cache memory.

If a determination is made at 104 that the function call is to write particular data to a file, a determination is made at 118 whether the file is on an exclusion list. The exclusion list identifies specific files that may be written to that are located on otherwise write-protected volumes. If the particular data is to be written to a file that is not on the exclusion list (i.e., the file is write-protected), the particular data cannot be written to the write-protected file. Instead, the particular data is written to cache memory at 120. At 122, a notification of a successful write is returned to the application programming interface at 122.

If a determination is made at 118 that the file is on the exclusion list, the particular data is written to the file on the write-protected volume at 124. At 126, a notification of a successful write is returned to the application programming interface at 122.

FIG. 2 is a block diagram illustrating one exemplary embodiment of a suitable system of the present invention. A system 200 comprises a user mode and a kernel mode. The user mode comprises a file/directory application programming interface 202 and/or a write filter application programming interface 204. The kernel mode comprises system services 206, input/output manager 208, file-based write filter 210, volatile write cache 212, file system driver 214, volume manager 216, disk driver 218, and non-volatile storage 220 (e.g., disk drive, floppy drive, and the like).

File/directory application programming interface 202 issues a function call (e.g., ReadFile, WriteFile, CreateFile, etc.) to system services 206, which in turn, passes the function call to input/output manager 208. Input/output manager 208 passes the function call to file-based write filter 210 which determines whether the function call is to read certain data from a file or to write particular data to a file. If file-based write filter 210 determines that the function call is to read certain data from a file, file-based write filter 210 determines if the certain data is located in volatile cache memory 212. If the certain data is in cache memory 212, the certain data is read and returned to the application programming interface 202.

If file-based write filter 210 determines that the certain data is not located in volatile cache memory 212, file-based write filter 210 passes the read function call to file system driver 214. File system driver 214 in turn obtains the certain data requested in the read function call by determining the file location from volume manager 216 and reads the data via disk drive 218 and non-volatile memory 220. Once the certain data is located and read from non-volatile memory 220, the certain data is returned to file-based write filter 210, written to volatile cache memory 212, and returned to application programming interface 202.

In one embodiment, a file may be partially read from volatile cache memory 212 and partially from non-volatile memory 220. Similar to the process described above, file/directory application programming interface 202 issues a function call and file-based write filter 210 determines that the function call is to read certain data from a file. Write filter 210 determines that the data is only partially located in volatile cache memory 212. File-based write filter 210 identifies the portion of the certain data that is missing from volatile cache memory 212, and passes the read function call for the missing portion of the certain data to file system driver 214. File system driver 214 in turn obtains the missing portion of the certain data requested in the read function call by determining the file location from volume manager 216 and reading the data via disk drive 218 and non-volatile memory 220. Once the portion of the certain data that is missing from volatile cache memory 212 is located and read from non-volatile memory 220, the certain data is returned to file-based write filter 210, written to volatile cache memory 212, and the certain data that was requested by the read function call is returned from volatile cache memory 212 to application programming interface 202.

If file-based write filter 210 determines that the received function call is to request that particular data be written to a file, file-based write filter 210 determines whether the file to which the particular data is to be written is on a file exclusion list. The exclusion list is a list of files on a write-protected volume that are permitted to be written to when a write function call is issued. In one embodiment, the application programming interface 202 passes the exclusion list of files to file-based write filter 210 as part of the configuration of the write filter settings. If file-based write filter 210 determines that the file is a file identified on the file exclusion list, the particular data is passed to input/output manager 208, and written to non-volatile memory 220 after the file is identified by file system driver 214, volume manager 216, and disk driver 218.

In one embodiment, once the particular data is written to the file located in non-volatile memory 220, a notification of a successful write is passed to application programming interface 202.

If file-based write filter 210 determines that the file to which the particular data is to be written is not on the file exclusion list, file-based write filter 210 writes the data to volatile cache memory 212.

In one embodiment, once the data is written to non-volatile memory 220, a notification of a successful write is passed to application programming interface 202.

In another embodiment, write filter application programming interface 204 sends a write file function call to file-based write filter 210. The write function call is thereafter processed in the same manner as is described above except that the notification of a successful write is passed to write filter application programming interface 204 and write filter application programming interface 204 interfaces directly with file-based write filter 210 instead of system services 206. This embodiment allows applications to change the configuration of the write filter, commit the changes to any file cached in volatile cache memory 212 to non-volatile memory 220, or back out of the changes cached in volatile cache memory 212 for any file.

Several aspects of the write filter beneficially provide volume protection by generally preventing particular data from being written to non-volatile media while allowing flexibility to selectively write particular data to specifically identified files on write-protected volumes that are identified on the file exclusion list.

In one embodiment, the write filter provides volume protection by preventing particular data from being written to non-volatile media. The write filter provides transparency for file system inputs and outputs including file and directory management function calls by writing particular data to a volatile cache memory instead of a write-protected volume. This functionality is significant in stateless computing devices that are executing operating systems or applications off of media such as read-only compact disks that do not permit data to be written upon it. The write filter thereby permits computing devices to capture all the write function calls that are issued by enabling particular data to be written to volatile cache memory rather than discarding them if either the media cannot be written upon (e.g., read-only media) or if write-protection techniques prohibit data from be written to non-volatile memory. Thus, by utilizing a write filter, all file system calls are honored and executed applications behave as expected by permitting particular data to be written to cache memory. Thus, a write filter permits a computing device executing applications from read only media (e.g., read only CDs or DVDs) to function as if they were operating from read-write media. The write filter feature is therefore ideal in the operation of stateless computing devices wherein it is undesirable to write particular data to non-volatile media. Non-limiting examples of stateless computing devices in which the write filter can be employed include public use computers such as internet cafes, library computers, print store computers, etc.; kiosk computing devices; and the like. Incorporating a write filter in a stateless computing device allows the particular data that was written to the volatile cache memory to be discarded upon rebooting the computing device. Thus, after each reboot, the stateless computing device can be returned to its original state without having its non-volatile memory unnecessarily store particular data, viruses, or other files that can impair or compromise its operation that are created by individual users.

In another embodiment, the write filter is incorporated in a stateless computing device wherein the write filter functionality permits the contents of the cache to be saved to memory or discarded while the computing device continues to operate (e.g., the computing device is not required to be rebooted for the cache contents to be saved to memory or discarded).

In another embodiment, the write filter provides flexibility by permitting file and folder-level writes to write-protected volumes through the utilization of exclusion file lists. Thus, the write filter maintains the volume protection by preventing writes to files that are not on the exclusion list while permitting flexibility where necessary to allow particular data to be written to specific files on a volume that have been identified as permissible, for example enabling paging of files, etc.

Unlike known methods of write protection that prevent particular data from being written to protected volumes at the sector/block level, embodiments of the present invention allow write filtering at the file system level. This improvement permits more precise control over the type of particular data and files that can be written to non-volatile storage, and the type of particular data that is permitted to only be written to cache memory. Thus, in one embodiment, the write filter permits regions of a disk or other non-volatile storage to be written upon, such as a user directory, while other parts are write-protected and stateless.

In another embodiment, the application programming interface that issues the various function calls (e.g., WriteFile, ReadFile, CreateFile, etc.) also configures the settings of the write filter. Examples of write filter settings that can be configured by the application programming interface include, but are not limited to, settings selected from the write filter file exclusion list, size of cache memory, number of modified files, size of modified files, and/or identification of modified files. In one example, writer filter settings can be configured to pre-allocate the size of cache memory. In another example, writer filter settings can be configured to allocate the size of cache memory as needed.

The following examples further illustrate embodiments of the invention.

EXAMPLE 1

Processing an Open or Create Function Call

When the write filter receives an open or create request for a file (either a regular file or a directory), it first locates the root of the directory tree for the volume the file is on. The write filter then reads the directory information for all the directories along the path leading up to the file to be opened/created, (e.g., from the root directory to the file's parent directory) if the directory information is not yet cached. The write filter obtains the directory information by calling file system functions repeatedly for each subdirectory along the path.

After the directory information of the file's parent directory is available, the write filter scans the directory entry list of the parent directory to check the existence of the file. Next, the write filter checks the desired access against the file attributes of the file if the file already exists. If it passes, the write filter further checks the desired access and share access against the current share access setting of the file if the file is already opened. The write filter fails the open request when either test fails. If the request is to create a new file and the file does not yet exist, the write filter creates an appropriate entry under its parent directory.

EXAMPLE 2

Creating a Balanced Data Tree in Cache Memory

The data of a file is typically divided into blocks of 4096 bytes in size. This size is the same as a page size used by a memory manager. Since most files are cached by the cache manager, even when a user application changes one byte of data, the cache manager will cache a full page of data with one modified byte. The memory manager subsequently lazy writes the entire dirty page back to non-volatile memory. As a result, when the write filter receives the write request from memory manager, the write size is 4096 bytes or multiple of 4096 bytes.

A balanced tree, more specifically, a red-black tree is used to describe the cached data for a file. A red-black tree is a binary search tree with an additional property of being red or black in color at each of its nodes. By constraining the color of each node, the red-black tree guarantees that no path from root to any leaf can be more than twice as long as any other paths. Each red-black tree node contains a number of blocks of data that are contiguous. Furthermore, each node in the tree represents a largest possible contiguous block of data. For example, if blocks 3, 4, 5, 7, 9, 10 are modified for a given file, the red-black tree for the file will have 3 nodes, the first one containing blocks 3, 4 and 5, the second one 7, and the third one 9 and 10. If, at this point, block 8 is modified, the last two nodes will merge into a bigger node, containing blocks 7, 8, 9 and 10. This way, if a file is modified sequentially, the red-black tree for the file always has one node.

EXAMPLE 3

Read/Write Function Calls

When the write filter receives a request to read certain data from a file, it maps the region of the certain data to be read into a list of contiguous 4096-byte blocks. If all blocks are available in the cache (i.e., in the red-black tree described in Example 2, above) of the file, it returns the cached data right away. Otherwise, the write filter issues a request to read the corresponding region storing the certain data from the underlying file system. It then overwrites the certain data with those blocks that are already cached, and returns the modified data.

When the filter receives a request to write to a file, it again maps the region of the data to be written into a list of contiguous 4096-byte blocks. For each block, if the block already exists in the cache, the write filter simply overwrites the original data with the new data. If the block does not exist in the cache, the write filter creates a new block containing the certain data to be written and adds the block to the cache (i.e., inserts the new block to the red-block tree). In the case that the first and/or last block do not align with the region of the write request, the write filter must issue read request to read the block(s) from the underlying file system first and overwrite the write data that is partially within the region of write request.

The exemplary operating environment illustrated in FIG. 2 includes a general purpose computing device such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices (not shown) may be connected to the computing device. A monitor or other type of display device (not shown) is also connected to the computing device. In addition to the monitor, computers often include other peripheral output devices (not shown) such as a printer and speakers, which may be connected through an output peripheral interface (not shown).

The computer may operate in a networked environment using logical connections to one or more remote computers. The remote computer may be a personal computer, a server, a router, a network PC, a peer device or other common network node, and typically includes many or all of the elements described above relative to the computer. Such networking environments are commonplace in offices, enterprise-wide computer networks, intranets, and global computer networks (e.g., the Internet).

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, the computer executes computer-executable instructions to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method for file-based write filtering, wherein a write filter comprises a file exclusion list, the method comprising:

receiving a function call from an application programming interface to perform at least one of (1) read certain data from a file stored on a storage of a computer or (2) write particular data to a file stored on the storage of the computer, said storage being a read-only storage medium;

if the received function call is to read the certain data from a file, then determining whether the certain data is in a cache memory;

in response to said determining indicating that the certain data is in the cache memory, reading the certain data from the cache memory, and returning the certain data from the cache memory to the application program interface, and in response to said determining indicating that the certain data is not in the cache memory, passing the read function call to a system driver;

if the received function call is a file-based write request to write particular data to a file on the storage, then determining whether the particular data is to be written to a file identified on the file exclusion list, said file exclusion list including information identifying files that can be written on a write-protected storage volume other than the storage of the computer;

in response to said determining indicating that the particular data is to be written to the file identified on the file exclusion list, writing the particular data to the file on the write-protected storage volume, and returning notification of a successful write on the storage to the application program interface, in response to said determining indicating that the particular data is to be written to a file not identified on the file exclusion list, writing the particular data to the cache memory, making the written particular data available on the cache memory without having the particular data written on the write-protected storage volume, and returning notification of the successful write on the storage to the application programming interface such that the application programming interface can proceed with its process even though the particular data is written on the cache memory and not the storage, wherein contents in the cache memory are deleted from the computer before rebooting the computer; and balancing the data in a cache memory data structure, said balancing comprising organizing the cache memory data structure, said cache memory data structure including a root node and leaf nodes and comprising a binary search tree with an additional property for each node of the cache memory data structure, wherein the tree structure guarantees that no path from the root to any leaf nodes can be more than twice as long as any other paths.

2. The computer-implemented method of claim 1, wherein the function call is to read the certain data from a file that is not in cache memory, the method further comprising:
receiving the certain data from the system driver;
writing the certain data in the cache memory; and
returning the certain data to the application programming interface.

3. The computer-implemented method of claim 1, wherein the particular data written to the cache memory is discarded upon rebooting the computer implementing the method.

4. The computer-implemented method of claim 3, wherein the computer implementing the method is stateless between reboots.

5. The computer-implemented method of claim 1, wherein one or more computer storage media have computer-executable instructions for performing the computer-executable method of claim 1.

6. A computer-implemented method for file-based write-filtering, wherein a file-based write filter comprises a file exclusion list, the method comprising:
receiving a function call for a file-based write request from an application programming interface to write particular data to a file on a storage of a computer, wherein the storage is a read-only storage media;
determining whether the particular data is to be written to the file identified on the file exclusion list, said file exclusion list including information identifying files that can be written on a write-protected storage volume other than the storage of the computer;
in response to said determining indicating that the particular data is to be written to the file not identified on the file exclusion list, writing the particular data to a cache memory, making the written particular data available on the cache memory without having the particular data written on the write-protected storage volume, and returning notification of the successful write on the storage to the application programming interface such that the application programming interface can proceed with its process even though the particular data is written on the cache memory and not on storage of the computer; and
deleting contents of the cache memory prior to rebooting the computer.

7. The computer-implemented method of claim 6, further comprising:
in response to said determining indicating that the particular data is to be written to the file identified on the file exclusion list; and
writing the particular data to the file if the file is a file identified on the file exclusion list.

8. The computer-implemented method of claim 7, further comprising:
returning a notification to the application programming interface that the particular data was successfully written.

9. The computer-implemented method of claim 6, further comprising:
receiving a function call to read certain data;
determining whether the certain data is in a cache memory;
in response to said determining indicating that the certain data is in the cache memory, reading the certain data from the cache memory, and returning the certain data from the cache memory to the application programming interface; and
in response to said determining indicating that the certain data is not in the cache memory, passing the read function call to a system driver.

10. The computer-implemented method of claim 6, further comprising:
determining the particular data in the cache memory to write to a volume; and
in response to said determining, writing the particular data to the volume.

11. The computer-implemented method of claim 6, wherein the computer implementing method is executing an operating system from a read-only media.

12. The computer-implemented method of claim 6, wherein the computer implementing method is stateless.

13. The computer-implemented method of claim 6, wherein the application programming interface configures the write filter settings.

14. The computer-implemented method of claim 13, wherein the filter settings configured by the application programming interface are settings selected from the group consisting of identifying the write filter exclusion list, specifying the size of the cache memory, identifying the number of modified files, identifying the size of modified files, and identifying the modified files.

15. The computer-implemented method of claim 6, wherein receiving comprises receiving the function call for a file-based read request from the application programming interface to read the particular data from the cache memory and if a portion of the certain data is stored in the cache memory, said receiving further comprising:
reading a missing portion of the certain data from the storage,
writing the missing portion of the certain data to the cache memory,
combining the missing portion of the certain data with the portion of the certain data in the cache memory, and
returning the certain data from the cache memory to the application programming interface.

16. One or more computer storage media having computer executable instructions for executing a file-based write filter in response to a receiving a function call from an application programming interface to read certain data from a file or write particular data to a file, said instructions comprising:
determining if the function call is to read certain data from a file stored on a storage of a computer or to write particular data to a file stored on the storage of the computer, said storage being a read-only storage medium;
If the function call is to read certain data from a file, determining whether the certain data is in a cache memory;

reading data from the cache memory in response to said determining that the certain data is in the cache memory; and passing the read function call to a system driver to read the certain data from non-volatile storage in response to said determining that the certain data is in the cache memory; and If the function call is to write particular data to the file, determining whether the particular data is to be written to the file identified on the file exclusion list, said file exclusion list including information identifying files that can be written on a write-protected storage volume other than the storage of the computer;

in response to said determining indicating that the particular data is to be written to the file not identified on the file exclusion list, writing the particular data to a cache memory, making the written particular data available on the cache memory without having the particular data written on the write-protected storage volume, and returning notification of the successful write on the storage to the application programming interface such that the application programming interface can proceed with its process even though the particular data is written on the cache memory and not the storage; and deleting contents of the cache memory prior to rebooting the computer.

17. The computer storage media of claim 16, wherein the application programming interface accesses and configures the write filter settings, said instructions further comprising:

configuring the write filter settings to include a file exclusion list identifying files located on non-volatile media to which particular data can be written.

18. The computer storage media of claim 17, wherein the function call is to write particular data to a file, said instructions further comprising:

determining whether the particular data is to be written to a file identified on the exclusion list; and writing the particular data to the file in response to said determining indicating the particular data is to be written to a file identified on the file exclusion list.

19. The computer storage media of claim 16, wherein if the function call is to read certain data from a file and if it is determined that a portion of the certain data is stored in the cache memory, reading a missing portion of the certain data from the storage, writing the missing portion of the certain data to the cache memory, combining the missing portion of the certain data with the portion of the certain data in the cache memory, and returning the certain data to the system driver to read the certain data from the cache memory.

* * * * *

UNITED STATES PATENT AND TRADEMARK OFFICE
CERTIFICATE OF CORRECTION

PATENT NO. : 7,640,404 B2  Page 1 of 1
APPLICATION NO. : 11/263469
DATED : December 29, 2009
INVENTOR(S) : Macintyre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Ninth Day of November, 2010

David J. Kappos
*Director of the United States Patent and Trademark Office*